United States Patent
Tyson

[15] 3,657,927
[45] Apr. 25, 1972

[54] SUPERCONDUCTING QUANTUM RATE GYRO DEVICE FOR DETECTING ROTATION

[72] Inventor: John Anthony Tyson, Bernardsville, N.J.
[73] Assignee: Bell Telephone Laboratories, Incorporated, Murray Hill, N.J.
[22] Filed: Feb. 25, 1970
[21] Appl. No.: 13,905

[52] U.S. Cl. .................................73/505, 324/43 R
[51] Int. Cl. ...............................................G01p 3/44
[58] Field of Search .......................73/505, 516, 517; 74/56; 324/43, 47

[56] References Cited

OTHER PUBLICATIONS

Zimmerman et al. " Compton Wavelength of Superconducting Electrons" in Physical Review Letters, May 1965 Vol. 14 No. 22, pgs. 887–888

Primary Examiner—Richard C. Queisser
Assistant Examiner—Herbert Goldstein
Attorney—R. J. Guenther and Edwin B. Cave

[57] ABSTRACT

A superconducting quantum rate gyro device for detecting rotation comprises a plurality of contiguous superconducting loops, superconducting electrons flowing in each of two opposite directions in the loops and means to measure quantum phase differences between electrons flowing in opposite directions. The loops are imbedded in a superconducting shield material to reduce electromagnetic self-inductance and improve detection of lower rotation rates.

11 Claims, 4 Drawing Figures

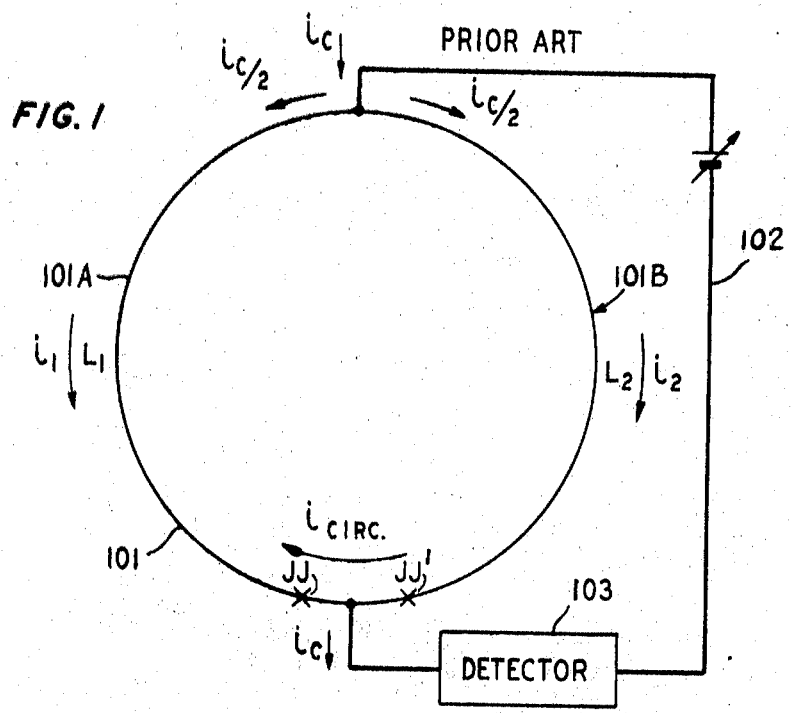
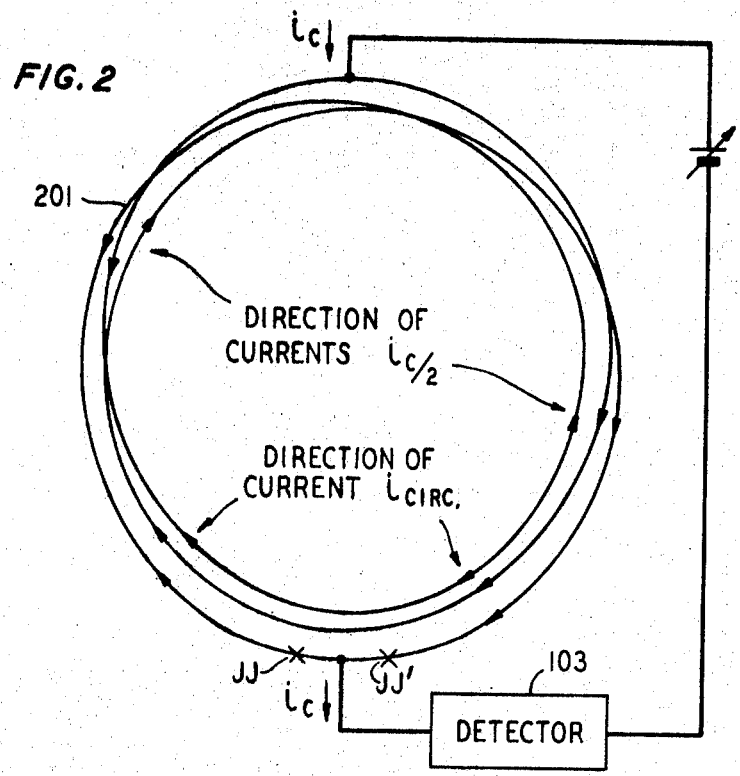

3,657,927

SUPERCONDUCTING QUANTUM RATE GYRO DEVICE FOR DETECTING ROTATION

BACKGROUND OF THE INVENTION

1. Field of the Invention

This invention relates to apparatus for detecting and measuring rotation rates with respect to an inertial frame of reference and more particularly to apparatus of this type based on the measurement of quantum interference effects.

2. Description of the Prior Art

The detection of rotation rates is an important capability in a number of different engineering and scientific areas. For example, rotation rate detection serves as the basis for various automatic steering control arrangements and for inertial navigation and guidance systems used in ships, aircraft and in space vehicles. The rotation rates of interest in most of such systems are relatively high, however, in comparison to the smallest rates that are of concern in the field of astrophysics, in the control systems of interplanetary vehicles and in scientific investigations dealing with the Lense-Thirring effect. Mechanical gyroscopes are insufficiently sensitive for rotation rates encountered in such applications.

It is known that rates of rotation smaller by several orders of magnitude than the limiting rates detectable by mechanical gyros can be measured through the rotative effects on the propagation of light in a modified two-beam interferometer arrangement. The feasibility of a system of this type was demonstrated by the classical experiments of A. A. Michelson and G. H. Gale and by G. Sagnac, as described in *Astrophysics Journal*, Vol. 61, 1945, at page 140; and in *Comptes Rendus*, Vol. 157, October 1913, at page 708, respectively. Briefly, in such a system, the two beams from a beam splitter are made to travel around a closed loop in opposite directions but along identical paths and then combined to produce an interference fringe pattern. The fringe pattern shift, resulting from the differential path length changes for the clockwise and counterclockwise beams caused by rotation of the system, is proportional to the rotation rate.

Additional orders of magnitude of improvement in the sensitivity of rotation rate measurements have been achieved by the use of traveling wave ring lasers as described by W. M. Macek and D. T. M. Davis, Jr., in *Applied Physics Letters*, Vol. 2, No. 3, February 1, 1963, pages 67–68. Here the enhancement of sensitivity is in part the result of optical heterodyning techniques and laser coherence which allow the direct measurement of frequency differences in the order of $1:10^{12}$. Nevertheless, frequency differences in that range often tend to disappear owing to frequency pulling effects and the tendency of what may be viewed as two independent oscillators operating at close to the same frequency to lock together in a single frequency. As a result, although ring lasers are effective in detecting relatively high rotation rates, their performance is inadequate at very low rates.

An approach toward increasing the sensitivity of rotation rate measurement still further is provided indirectly by a superconducting quantum inertial detector (SQUID), a device which is typically used in the measurement of small magnetic fields. In the SQUID, superconducting electrons which are made to travel in a superconductive loop may, owing to quantum wave effects, be considered as equivalent to a traveling coherent wave, having a wavelength, however, that is very short compared to the wavelength of light. The increase in potential for refined measurement, as compared to that provided by the traveling wave ring laser system, is grounded on the same theory that explains the superiority of laser optics over ordinary optics or the superiority of an electron microscope over an optical microscope. In the SQUID, however, it is the quantum phase coherence of the superconducting electrons, rather than the phase coherence of a laser beam, that makes available the potential of exceptional sensitivity for magnetic field measurement.

Since it is known that a difference in quantum phase may be created between the flow of superconducting electrons in the two halves of the superconductive loop of a SQUID by a corresponding physical rotation, as well as by the more usual application of a corresponding magnetic field to be measured, it would appear that rotation rate also could be detected with great accuracy. Heretofore, however, this assumed potential has proved wholly illusory for the simple reason that electromagnetic effects, self-inductance for example, are so large that in practice only very rapid rotation rates can be measured.

Accordingly, a broad object of the invention is to detect and measure heretofore undetectable rates of rotation of a body with respect to an inertial frame of reference.

A more specific object is to enhance the sensitivity of rotation rate measurement in a system based on interferometer reaction to quantum phase differences.

SUMMARY OF THE INVENTION

The foregoing objects and additional objects are achieved in accordance with the principles of the invention by modifying a SQUID toward the end of increasing the kinetic inductance of the coherent superconducting electrons to a level that greatly exceeds the electromagnetic self-inductance of the loop. It is this basic change in the fundamental properties of a SQUID that enables a superconducting quantum rate gyro (SQRG), in accordance with the invention, to avoid the electromagnetic effects that limit the rotation rate measuring capabilities of prior art instruments.

The SQUID modifications effected in accordance with the principles of the invention may be defined in terms of specific features. The first and major contribution toward shielding out the effects of electromagnetic self-inductance is achieved by embedding the entire superconducting coil in a solid superconductive shield such as lead, for example. To prevent the shield material from shorting out the loop, the loop is protected by a thin layer of normal nonsuperconductive metal or insulation.

Secondly, the invention exploits the cancellation of self-inductance properties by a plurality of contiguous loops, each additional loop serving to effect a linearly proportional increase in the sensitivity of detection.

Thirdly, in accordance with the invention, the basic structure of the loops may be tailored to increase further the kinetic inductance in relation to the electromagnetic inductance. Specifically, a feature of the invention is the use of a thin film or ribbon to form the superconductive loop. Although the most significant improvements in sensitivity are achieved through the use of the solid shielding material and the use of multiple loops, it can be shown that the thin film loop structure also contributes measurably to the attainment of still higher levels of sensitivity.

BRIEF DESCRIPTION OF THE DRAWING

FIG. 1 is a sketch of a superconducting quantum inertial detector known in the prior art;

FIG. 2 is a sketch of a superconducting quantum rate gyro in accordance with the invention;

DETAILED DESCRIPTION

Figure 3:
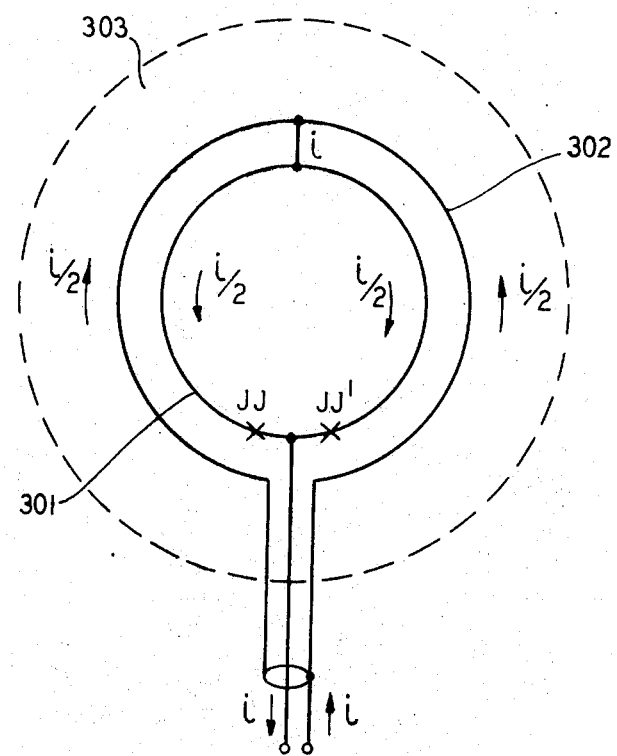
FIG. 3 is a modification of the apparatus shown in FIG. 2.

A brief discussion of the superconducting quantum inertial detector (SQUID), as shown in FIG. 1, will serve as a useful preface to a detailed description of the specific embodiments of the invention shown in FIGS. 2 and 3. The SQUID employs a single superconductive loop 101 comprising a left half 101A and a right half 101B. An external circuit 104 connected between terminal points, $P_1$ and $P_2$ on the loop 101 includes an electron source 102 and an electron current detector 103. Each of the loop halves 101A and 101B includes a respective one of a pair of Josephson junction devices JJ and JJ'. As indicated by the small arrows, a current flow $i_c$ from the source 102 divides into two currents $\frac{1}{2} i_c$ flowing in opposite directions around the loop. The combined total current that flows around the loop 101 is designated $i_{circ}$. When subjected to an external magnetic field, a quantum mechanical phase interference occurs between the currents flowing through the junctions JJ and JJ' which is directly analogous to the interference observed in the double-slip interferometer experiments with light beams. The magnitude of the interference phenomenon, which is indicative of the level of magnetic flux to which the loop is subjected, is detected by suitably detection apparatus 103. Additional details of such an arrangement are described by R. C. Jaklevic, J. Lambe, A. H. Silver, and J. E. Mercereau in *Physical Review Letters*, Vol. 12, No. 7, February 17, 1964, pages 159–160.

In *Physical Review Letters*, Vol. 14, No. 22, May 31, 1965, at page 887, J. E. Zimmerman and J. E. Mercereau describe how the quantum phase interference created in a superconducting loop exposed to a magnetic field can, alternatively, be made to occur in response to a mechanical rotation of the loop. Detection and measurement are carried out with a deBroglie superconducting wave interferometer (SQUID).

Although the SQUID responds to magnetic fields as small as $10^{-9}$ gauss, quantum phase differences created by rotation are very difficult to detect, particularly when the rotation rates are very low, owing to the relatively large self-inductance $L$ of the loop 101. From FIG. 1, if $L$, the self-inductance of the loop, consists of the sum of $L_1$ and $L_2$, the inductances in the respective loop halves 101A and 101B, we may write the following expression for the total magnetic flux through the loop:

$$\Phi = L i_{circ} + L_2 \frac{i_c}{2} - L_1 \frac{i_c}{2} \qquad (1)$$

As indicated, the flux $\Phi$ is the sum of the contributions from the circulating current and the two branches of the current $i_c$, which are produced by external electronics, indicated schematically by the source 102.

In a superconducting loop, the total integrated phase around the loop is an integer times $2\pi$ (quantization) as follows:

$$\oint \left( 2m_e \underline{v}_s + \frac{2e}{c} \underline{A} \right) \cdot d\underline{s} = nh \text{ where } \oint \qquad (2)$$

indicates integration around the loop, where $n$ is an integer, where $m_e$ is electron mass, where $\underline{v}_s$ is the electron velocity, where $e$ is electron charge, where $h$ is Planck's constant, where $c$ is the velocity of light and where $\underline{A}$ is the electromagnetic vector potential $$\left( \oint \underline{A} \cdot d\underline{s} \equiv \Phi, \text{ the enclosed flux} \right)$$

The phase quantization of Equation (2) connects variations in phase with rotation and/or flux, which for homogeneous fields, may be written as follows:

$$\delta\theta = (\delta k / k_o) + (\delta \Phi / \Phi_o), \qquad (3)$$

where $\delta\theta$ is the change in phase, where $k$ and $\Phi$ are the circulation and magnetic flux. Their respective quanta may be expressed as $k_o = h/4m_e$, $\Phi_o = hc/2e$. As indicated above, in the SQUID sensitivity $\delta i_c$ to magnetic fields is limited by the inductance of the loop. This relation may be expressed as follows:

$$i_{circ} \approx \delta i_c \approx \Phi_o / L. \qquad (4)$$

As Equation (3) indicates, the SQUID is in principle responsive to rotation, which is represented by the first term of the equation, as well as to magnetic flux, which is represented by the second term. As discussed above, however, the electromagnetic effects ($\Phi$) are so large that in practice, only very high rotation rates can be detected.

In accordance with the invention, the SQUID is modified to make the kinetic inductance of the coherent superconducting electrons very much larger than the electromagnetic self-inductance of the loop, thereby making the superconducting quantum rate gyro (SQRG) of the invention insensitive to magnetic flux and highly sensitive to rotation.

Figure 4:
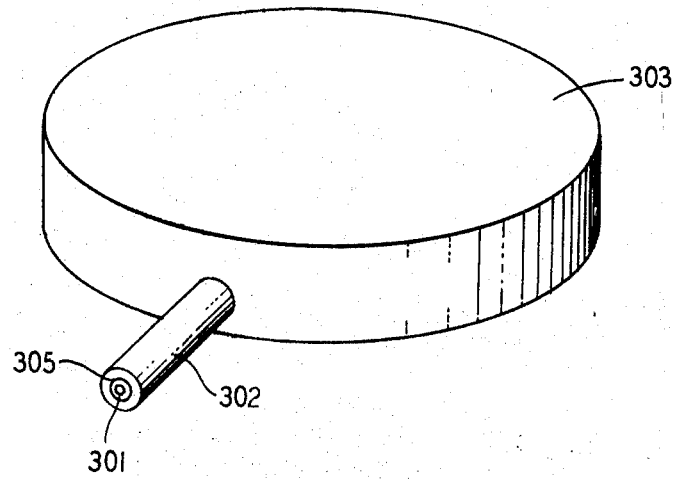
FIG. 4 is a perspective view of the superconductive shield employed in accordance with the invention.

In the light of the principles of the invention, it is evident from Equation (4) that if the electromagnetic self-inductance $L$ can be shielded out, the self-limiting aspect of the device can be reduced and at the same time, the sensitivity to inertial effects could be raised. In accordance with the invention, the entire loop 101 as shown in FIG. 1 is imbedded in a superconductive medium 303, which may be of the general form shown in FIG. 4, so that each current element on the loop is shielded from all other current elements, which is to say, $L = 0$. The superconductive shield 303 cannot be allowed to short out the loop 101, however, and accordingly, as another feature of the invention, a thin layer of normal (nonsuperconducting) metal or insulator 305, as shown in FIG. 4, is applied as a cover to the surface of the loop and to connecting leads such as lead 301. This thin layer 305 allows some currents to be magnetically coupled to other nearby currents resulting in some residual electromagnetic inductance, $L^*$, which may be expressed as:

$$L^* = \beta L, \beta << 1. \qquad (5)$$

There is also a very small contribution to the reduction factor $\beta$ from impurities in the superconductive shield 303.

In accordance with the invention it is crucial that the shield material 303 fill the entire volume within the interferometer loop 101 and, also, that it be a soft type I superconductor having a superconducting transition temperature $T_c$ much larger than the transition temperature $T_{co}$ of the loop material. For example, lead may be used for the shield material and niobium-zirconium wire (with epoxy, Teflon, or copper insulation for example) may be used for the loop.

From the theoretical viewpoint, the use of magnetic superconductive shielding in accordance with the invention reduces the second term in the integrand of Equation (2) to a magnitude that is comparatively much smaller than the first term. As a result, if the mechanical momentum $2m_e \underline{v}_s$ of the superconducting electron pairs dominates the phase integral, the interferometer is necessarily made more sensitive to inertial effects, which is to say rotation, than to electromagnetic effects.

Another modification of the SQUID apparatus of FIG. 1 which is made in accordance with the invention is the substitution of a multiple loop 101N as shown in FIG. 2 for the single loop 101 of FIG. 1. All of the turns of the loop 101N must be imbedded in superconductive shield material, however, to ensure a minimal level of self-inductance. By keeping the multiple windings of the loop symmetrical so that $L_1 = L_2$, the number of turns can be increased and the size of the loops can be extended until the new residual self-inductance of the N-turn loop reaches the original self-limiting value $L$:

$$N_{max} = \beta^{-one-half}, \qquad (6)$$

which is to say that the maximum number of turns is just that number which returns the electromagnetic self-inductance of the N-turn symmetrical loop to the original maximum allowable value $L$.

With the modifications indicated, the interferometer is in effect made $N$ times more sensitive to rotation. The apparatus shown in FIG. 2 illustrates this type of loop winding configuration for a simple three-turn SQRG. Just as in the SQUID, when the self-limiting sensitivity is reached, some of the currents $i_c/2$ cancel the circulating current $i_{circ}$.

With an $N$-fold increase in the effective enclosed area of the basic loop, which of course would not be possible without shielding, the first term in the integrand of the phase integral of Equation (2) is effectively made $N$ times as large. This change results in the following amplification of rotational sensitivity in Equation (3):

$$\delta\Phi = N \frac{\delta k}{k_o} + \frac{\delta\Phi}{\Phi_o}. \qquad (7)$$

In accordance with the invention, the kinetic inductance of the superconductive interferometer loop may be increased still further beyond its electromagnetic inductance by employing a thin film ribbon for the loops formed from some suitable material such as aluminum, for example, with aluminum oxide serving as insulation. The transition temperature $T_{co}$ of aluminum which is 1.2° K should be, ideally, just below the operating temperature of the SQRG to ensure maximum enhancement of kinetic induction effects. This phenomenon is explained by W. A. Little in a paper, "Device Application of Super-Inductors" published in the Proceedings of the Symposium of the Physics of Superconducting Devices, sponsored by the Office of Naval Research, Physics Branch, held at the University of Virginia April 28-29, 1967. The increased sensitivity to rotation from the use of thin film may be described by the parameter $\gamma$ as follows:

$$\delta\theta = \gamma \beta^{-\frac{1}{2}} \frac{\delta k}{k_o} + \frac{\delta \Phi}{\Phi_o} \tag{8}$$

where we have substituted Equation (6) in the phase shift relation.

In the construction of the N-turn thin film coil, it is essential that sufficient soft superconductive shield material be included between each successive turn to ensure completely effective shielding throughout the coil length. A related consideration is the desirability of employing a type of overall physical design that ensures minimal levels of trapped flux, flux creep, and field breakdowns. An illustrative arrangement embodying these features is shown in the combination of FIGS. 3 and 4 in which access to the interferometer loop 301, which is a multiple loop illustrated schematically by a single line, is gained first through a long shielded coaxial port 302 from which the current is lead around in an access loop 302A which helps to cancel fields of the returning interferometer biasing current.

The above increases of kinetic inductance of the superconducting electron pairs are equivalent to reducing the $e/m$ ratio of the charge carrier, since in the limit of small charge $e$ and large mass $m$, the dynamics are dominated by inertial reactance.

Theoretical maximum performance levels of the SQRG can be predicted by inserting typical values of $\beta$, $\gamma$, $k_o$, and other key parameters into certain of the equations discussed above. For example, if a phase shift of $10^{-2}$ can be detected with a signal-to-noise ratio of unity, then we have $$\delta\theta \approx 10^{-2} = \gamma \beta^{-one\text{-}half}(\delta k/k_o), \tag{9}$$

where $k_o = L/4m_e$ is the quantum of circulation. Using $\beta \approx 10^{-6}$ (with a maximum of $10^3$ turns), $\gamma \approx 10^3$, and a loop area $a_o$ of 2 cm² in the relation $$\delta k_{min} = 10^{-2} k_o \beta^{one\text{-}half} \gamma^{-1} = \delta\Omega_{min} a_o, \tag{10}$$

gives a self-limited rotational sensitivity limit of $$\delta\Omega_{min} \approx 10^{-8} \text{ rad/sec} \tag{11}$$

for a device a few centimeters across. Using larger areas, a device of 10 centimeters radius, for example, leads to a predicted sensitivity limit of $10^{-10}$ rad/sec, assuming sufficient shielding. Long integration times and multiple interferometers may be employed to increase rotational sensitivity still further. It should be noted that ideally a SQRG should also be shielded from vibration since any change in the loop area $a_o$ is multiplied $N$ times in the output.

It is to be understood that the embodiment described herein is merely illustrative of the principles of the invention. Various modifications thereto may be effected by persons skilled in the art without departing from the spirit and scope of the invention.

What is claimed is:

1. Apparatus for sensing a physical rotation rate with respect to a frame of inertial reference, comprising in combination, a plurality of contiguous superconductive loops, means for initiating a flow of superconductive electrons in each of two opposite directions in said loops, means for detecting a quantum phase difference between electrons flowing in one side of said loops and in the opposite side of said loops, said phase difference being caused by rotational movement of said loops with respect to said frame of reference, and superconducting shield material for blocking out magnetic flux from the immediate vicinity of said loops, said loops being imbedded in said shield material and said shield material filling the interior volume defined by said loops.

2. Apparatus in accordance with claim 1 wherein said loops are insulated from said shield material.

3. Apparatus in accordance with claim 2 wherein said loops comprise a superconducting wire.

4. Apparatus in accordance with claim 1 wherein said detecting means includes first and second Josephson junction devices each connected on a respective side of one of said loops.

5. Apparatus in accordance with claim 2 wherein said loops are formed from a thin film of superconductive material.

6. Apparatus in accordance with claim 1 wherein said thin film comprises aluminum covered by a coating of aluminum oxide.

7. Apparatus for sensing a physical rotation rate with respect to a frame of inertial reference comprising, in combination, a plurality of contiguous superconductive loops, electromagnetic flux shield material filling the volume within said loops, said loops being imbedded within said shield and said shield comprising a superconductive material, the superconductive material of said loops having a transition temperature substantially larger than the transition temperature of said shield material, insulating material affixed to said loops thereby to preclude shorting out said loops with said shield material, means for initiating a flow of superconducting electrons in each of two opposite directions around said loops, and means for detecting a quantum phase difference between electrons flowing in one side of said loops and in the opposite side of said loops, said phase difference being caused by rotational movement of said apparatus with respect to a frame of reference.

8. Apparatus in accordance with claim 7 wherein said loops comprise a niobium-zirconium wire and wherein said shield material comprises lead.

9. Apparatus in accordance with claim 7 wherein said loops comprise a thin film strip of aluminum.

10. Apparatus in accordance with claim 7 wherein said detecting means includes a pair of Josephson junctions each connected on a respective side of one of said loops.

11. Apparatus for sensing a physical rotation rate with respect to a frame of reference comprising, in combination, a plurality of contiguous substantially symmetrical superconductive loops, electromagnetic flux shield material surrounding said loops and filling the volume within said loops, an access loop including coaxial feed means for directing a flow of electrons into said loops in each of two opposite directions around said loops, insulating material affixed to said loops thereby to preclude shorting out said loops with said shield material, and means for detecting a quantum phase difference between electrons flowing in one side of said loops and in the opposite side of said loops, said phase difference being caused by rotational movement of said apparatus with respect to a frame of inertial reference.

* * * * *